US008825745B2

(12) United States Patent
Prish

(10) Patent No.: US 8,825,745 B2
(45) Date of Patent: Sep. 2, 2014

(54) URL-FACILITATED ACCESS TO SPREADSHEET ELEMENTS

(75) Inventor: Shahar Prish, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 538 days.

(21) Appl. No.: 12/873,165

(22) Filed: Aug. 31, 2010

(65) Prior Publication Data
US 2012/0011195 A1    Jan. 12, 2012

Related U.S. Application Data

(60) Provisional application No. 61/363,255, filed on Jul. 11, 2010.

(51) Int. Cl.
G06F 15/16 (2006.01)

(52) U.S. Cl.
USPC .......................................... 709/203; 709/217

(58) Field of Classification Search
USPC .................. 709/203, 217–219, 227–234
See application file for complete search history.

(56) References Cited

U.S. PATENT DOCUMENTS

| 5,576,954 | A |   | 11/1996 | Driscoll |   |
|---|---|---|---|---|---|
| 5,634,124 | A | * | 5/1997 | Khoyi et al. | 1/1 |
| 5,852,816 | A |   | 12/1998 | Thaler |   |
| 6,012,067 | A |   | 1/2000 | Sarkar |   |
| 6,418,448 | B1 |   | 7/2002 | Sarkar |   |
| 6,460,043 | B1 |   | 10/2002 | Tabbara et al. |   |
| 6,470,343 | B1 |   | 10/2002 | O'Brien et al. |   |
| 6,701,485 | B1 |   | 3/2004 | Igra | 715/503 |
| 6,721,747 | B2 |   | 4/2004 | Lipkin |   |
| 6,938,079 | B1 |   | 8/2005 | Anderson et al. |   |
| 6,957,214 | B2 |   | 10/2005 | Silberberg et al. |   |
| 6,986,047 | B2 |   | 1/2006 | Giles et al. |   |
| 6,988,241 | B1 | * | 1/2006 | Guttman et al. | 715/220 |

(Continued)

FOREIGN PATENT DOCUMENTS

| EP | 1457907 | 9/2004 |
|---|---|---|
| EP | 1696348 | 8/2006 |

(Continued)

OTHER PUBLICATIONS

Adams Holt, "Best Practices for Web Services, Part 12: Web Services Security, Part 2", Retrieved at<<http://www.ibm.com/developerworks/webservicesllibrary/ws-best12/>>, Mar. 30, 2004, pp. 6.

(Continued)

Primary Examiner — Yasin Barqadle
(74) Attorney, Agent, or Firm — Jim Ross; Leonard Smith; Micky Minhas

(57) ABSTRACT

Embodiments are directed to providing URL-facilitated access to spreadsheet component elements. In embodiments, a client may discover and then access elements of an existing workbook directly through a URL. In embodiments, a client may also provide, through a URL, value(s) for parameter(s) defined by the existing workbook. If value(s) are provided by the client, the workbook may be recalculated using the value(s) before a requested element of the workbook is returned to the client. In embodiments, the workbook is recalculated using a transient copy of the workbook, which is then discarded and the original workbook remains unchanged. Data changed in the workbook is automatically reflected in returned elements of the workbook when a request for such element is refreshed.

20 Claims, 8 Drawing Sheets

(56) References Cited

U.S. PATENT DOCUMENTS

| | | | |
|---|---|---|---|
| 7,012,916 B2 | 3/2006 | Low et al. | |
| 7,039,704 B2 | 5/2006 | Davis et al. | |
| 7,054,877 B2 | 5/2006 | Dettinger et al. | |
| 7,080,078 B1 | 7/2006 | Slaughter et al. | |
| 7,117,227 B2 | 10/2006 | Call | |
| 7,171,472 B2 | 1/2007 | O'Brien et al. | |
| 7,275,087 B2 | 9/2007 | Vaschillo et al. | |
| 7,395,552 B2 | 7/2008 | Taylor et al. | |
| 7,434,252 B2 | 10/2008 | Ballinger et al. | |
| 7,461,334 B1 | 12/2008 | Lu et al. | |
| 7,502,760 B1 | 3/2009 | Gupta | |
| 7,512,623 B2 | 3/2009 | Apps et al. | |
| 7,548,615 B2 | 6/2009 | Bhalgat et al. | |
| 7,689,483 B2 | 3/2010 | Wu et al. | |
| 8,078,870 B2 | 12/2011 | Nanda et al. | |
| 8,090,792 B2* | 1/2012 | Dubnicki et al. | 709/217 |
| 2002/0188629 A1* | 12/2002 | Burfoot | 707/503 |
| 2003/0004964 A1 | 1/2003 | Cameron et al. | |
| 2003/0055921 A1 | 3/2003 | Kulkarni et al. | |
| 2003/0182305 A1 | 9/2003 | Balva et al. | |
| 2004/0002939 A1 | 1/2004 | Arora et al. | |
| 2004/0034651 A1 | 2/2004 | Gupta et al. | |
| 2004/0103365 A1* | 5/2004 | Cox | 715/503 |
| 2004/0193579 A1 | 9/2004 | Dettinger et al. | |
| 2005/0055355 A1 | 3/2005 | Murthy et al. | |
| 2005/0060315 A1 | 3/2005 | Sanin | |
| 2005/0114485 A1 | 5/2005 | McCollum | |
| 2005/0165784 A1 | 7/2005 | Gomez et al. | |
| 2005/0198567 A1* | 9/2005 | Vermeulen et al. | 715/513 |
| 2005/0232163 A1 | 10/2005 | Zabihi et al. | |
| 2005/0267868 A1* | 12/2005 | Liebl et al. | 707/2 |
| 2005/0267871 A1 | 12/2005 | Marchisio et al. | |
| 2005/0273311 A1* | 12/2005 | Lautt et al. | 703/22 |
| 2006/0024653 A1 | 2/2006 | Battagin | 434/350 |
| 2006/0031204 A1 | 2/2006 | Liu et al. | |
| 2006/0041661 A1 | 2/2006 | Erikson et al. | |
| 2006/0069995 A1 | 3/2006 | Thompson et al. | |
| 2006/0161522 A1 | 7/2006 | Dettinger et al. | |
| 2006/0161577 A1* | 7/2006 | Kulkarni et al. | 707/102 |
| 2006/0195460 A1 | 8/2006 | Nori et al. | |
| 2006/0195476 A1 | 8/2006 | Nori et al. | |
| 2006/0224628 A1 | 10/2006 | Gupta et al. | |
| 2006/0235836 A1 | 10/2006 | Dettinger et al. | |
| 2006/0264202 A1 | 11/2006 | Hagmeier et al. | |
| 2006/0282823 A1 | 12/2006 | Li et al. | |
| 2006/0282886 A1 | 12/2006 | Gaug | |
| 2006/0294042 A1 | 12/2006 | Kapadia et al. | |
| 2007/0061698 A1* | 3/2007 | Megiddo et al. | 715/503 |
| 2007/0067257 A1 | 3/2007 | Chen | 707/1 |
| 2007/0100872 A1 | 5/2007 | Bodin et al. | |
| 2007/0106629 A1 | 5/2007 | Endacott et al. | |
| 2007/0143835 A1 | 6/2007 | Cameron et al. | |
| 2007/0156842 A1 | 7/2007 | Vermeulen et al. | |
| 2007/0168228 A1 | 7/2007 | Lawless | |
| 2007/0233580 A1 | 10/2007 | Pike et al. | |
| 2007/0233708 A1 | 10/2007 | Baio et al. | |
| 2007/0239726 A1 | 10/2007 | Weiss et al. | |
| 2008/0082638 A1 | 4/2008 | Kaler et al. | |
| 2008/0141028 A1 | 6/2008 | Wei et al. | |
| 2008/0168273 A1 | 7/2008 | Chung et al. | |
| 2008/0178272 A1 | 7/2008 | Gaijala et al. | |
| 2008/0183850 A1 | 7/2008 | Basu et al. | |
| 2008/0201234 A1 | 8/2008 | Castro et al. | |
| 2008/0201338 A1 | 8/2008 | Castro et al. | |
| 2008/0289039 A1 | 11/2008 | Rits et al. | |
| 2008/0301784 A1 | 12/2008 | Zhu et al. | |
| 2009/0013087 A1 | 1/2009 | Lorch et al. | |
| 2009/0210400 A1 | 8/2009 | Castro et al. | |
| 2009/0252159 A1 | 10/2009 | Lawson et al. | |
| 2009/0319795 A1 | 12/2009 | Sharif et al. | |
| 2009/0328178 A1 | 12/2009 | McDaniel et al. | |
| 2010/0037303 A1 | 2/2010 | Sharif et al. | |
| 2010/0251345 A1 | 9/2010 | James et al. | |

FOREIGN PATENT DOCUMENTS

| | | |
|---|---|---|
| JP | 2006/244498 | 9/2006 |
| JP | 2006/277726 | 10/2006 |
| WO | WO2007011917 A2 | 1/2007 |
| WO | WO2007011917 A3 | 1/2007 |

OTHER PUBLICATIONS

"Access cloud Data with Astoria," 1998-2007, 1105 Media Inc., pp. 4.

Amendment and Response to Final Office Action mailed Sep. 29, 2010, filed in U.S. Appl. No. 11/675,933, filed Dec. 29, 2010, 12 pp.

Amendment and Response to Non-Final Office Action mailed Jan. 31, 2011, filed in U.S. Appl. No. 11/675,933, filed Apr. 27, 2011, 11 pp.

Amendment and Response to Non-Final Office Action mailed Jan. 5, 2011, filed in U.S. Appl. No. 12/032,640, filed Apr. 5, 2011, 18 pp.

Amendment and Response to Non-Final Office Action mailed Jul. 26, 2010, filed in U.S. Appl. No. 12/032,640, filed Oct. 26, 2010, 16 pp.

B. Ludaescher, A. Gupta, and E.M. Martone, "Model-Based Mediation with Domain Maps", 17th Intl. Conference on Data Engineering (ICDE), Heidelberg, Germany, IEEE Computer Society, 2001, http://legacy-web.nbirn.net/Publications_rd/Presentations/model_based_mediation_sic.pdf, 10 pp.

Berners-Lee et al. "Requst for Comments 1945; Hypertext Transfer Protocol—HTIP/1.0", Network Working Group, May 1996, pp. 1-60, Retrieved at<<http://www.ietf.org/rfclrfc1945.txt>>, 51 pp.

Castro, "Project Astoria," Feb. 2008, Microsoft Corporation, pp. 10.

Castro, "Project Astoria: REST Data Services for the Web," submitted for acceptance to SIGMOD'07 on Nov. 16, 2007, ACM, 2007, pp. 1-9.

Chen, "Behind Microsoft's Astoria REST Framework," 2006-2007, C4Media, Inc. pp. 2.

Chinese Notice on the First Office Action mailed Feb. 17, 2011, in Chinese Application No. 200880005232.9, 9 pp.

Chinese Notice on the First Office Action mailed Feb. 23, 2011, in Chinease Application No. 200880005008.X, 12 pp.

Cibraro Pablo M. Authenticating Users with Supporting Tokens in WCF n, Retrieved at<<http://weblogs.asp.neV cibrax/archive/2008/0 1/22/authenticating-users-with-supporting-tokens-in-wcf.aspx>>, 2 pp.

Final Office Action mailed in U.S. Appl. No. 11/675,944, dated Sep. 29, 2009, 13 pp.

Final Office Action mailed in U.S. Appl. No. 11/675,933, dated Oct. 30, 2009, 13 pp.

Final Office Action mailed in U.S. Appl. No. 11/675,933, dated Sep. 29, 2010, 19 pp.

Final Office Action mailed in U.S. Appl. No. 12/032,640, dated Jan. 5, 2011, 17 pp.

"Google Data APIs (Beta) Developer's Guide", http://code.google.com/apis/gdata/overview.html, Jan. 25, 2007, 3 pp.

H. Jiang, H. Lu, W. Wang, and J. X. Yu. Path materialization revisited: An efficient storage model for XML data. In Proc. of ADC, 2002, http://delivery.acm.org/1 0.1145/570000/563916/p85-jiang.pdf?key1=563916&key2=5924369611 &coli=GUIDE&d1=GUIDE&CFID=9764553&CFTOKEN=31 001415, 10 pp.

"International Search Report", Mailed Date: Nov. 30, 2010, Application No. PCT/US2010/034402, Filed Date: May 11, 2010, pp. 3.

International Search Report and Written Opinion dated Jul. 28, 2008 for PCT Application Serial No. PCT/US2008/054223, 44 pp.

International Search Report and Written Opinion dated Jun. 26, 2008, for International Application No. PCT/US08/054224, 39 pp.

J. Broekstra, A. Kampman, and F. Van Harmelen. Sesame: A generic architecture for storing and querying rdf and rdf schema. In The Semantic Web—ISWC 2002, vol. 2342 of Lecture Notes in Computer Science, pp. 54-68. Springer, 2002, http://rdf.cs.vu.nl/doc/papers/Sesame-ISWC2002.pdf, 16 pp.

Jeff Bone. REST, RPC, mountains, molehills, and a retraction (sort of). Wed, Aug. 8, 2001 13:11:05-0500. Message posted at http://www.xent.com/pipermail/fork/2001-August/002801.html., 6 pp.

(56) References Cited

OTHER PUBLICATIONS

Khare et al., "Extending the REpresentational State Transfer (REST) Architectural Style for Decentralized Systems", Proceedings of the 26th International Conference on Software Engineering, 2004, pp. 10.
Khare et al., "Extending the REpresentational State Transfer (REST) Architectural Style for Decentralized Systems," Proceedings of the 26th International Conference on Software Engineering, 2004, pp. 10.
Lacey Pete, "Message level Security and REST", Retrieved at<<http://72.249.21.88/nonintersectingl? year=2007&monthnum=05&day=25&name=message-level-security-and-rest&page>>, May 25, 2007, 5 pp.
Martin Hamilton, "Uniform resource identifiers & the simple discovery protocol", http://martinh.net/uris/uris.html, Nov. 25, 2007, 2 pp.
Microsoft Corporation, "The ADO.NET Entity Framework Overview", Visual Studio 2005 Technical Articles, http://msdn2.microsoft.com/en-us/library/aa697427(VS.80).aspx, Jan. 25, 2007, 34 pp.
Microsoft Corporation, [*MS-ESREST*]: *Excel Services REST Protocol Specification*. Jun. 3, 2010, pp. 1-38.
Microsoft Corporation, [*MS-ESREST*]: *Excel Services REST Protocol Specification*. Jun. 27, 2010, pp. 1-38.
Non-Final Office Action mailed in U.S. Appl. No. 11/675,944, dated Dec. 11, 2008, 12 pp.
Non-Final Office Action mailed in U.S. Appl. No. 11/675,933, dated Apr. 14, 2010, 15 pp.
Non-Final Office Action mailed in U.S. Appl. No. 11/675,933, dated Apr. 14, 2009, 16 pp.
Non-Final Office Action mailed in U.S. Appl. No. 11/675,933, dated Jan. 31, 2011, 16 pp.
Non-Final Office Action mailed in U.S. Appl. No. 12/032,640, dated Jul. 26, 2010, 17 pp.
Non-Final Office Action mailed in U.S. Appl. No. 12/032,640, dated Jun. 7, 2011, 19 pp.
Notice of Allowance mailed Jul. 25, 2011 in U.S. Appl. No. 12/465,725, 10 pp.
Overview: ADO.NET Data Services ("Project Astoria"), Dec. 2007, Microsoft Corporation, pp. 11.
Peter Pin-Shan Chen, The entity-relationship model—toward a unified view of data, ACM Transactions on Database Systems (TODS), v.1 n.1, p. 9-36, Mar. 1976, 28 pp.
Prish, Shahar, *Advanced Excel Services REST API capabilities—passing parameters to a spreadsheet*. Nov. 5, 2009, pp. 1-2.
Prish, Shahar, *Bringing it all back home—using advanced REST functionality with the Excel Services Gadget*. Nov. 6, 2009, pp. 1-2.
Prish, Shahar, *Coding the Excel Services Windows 7 Gadget—Part 1—Settings*. Nov. 10, 2009, pp. 1-3.
Prish, Shahar, *Coding the Excel Services Windows 7 Gadget—Part 2—Charts*. Nov. 11, 2009, pp. 1-3.
Prish, Shahar, *Coding the Excel Services Windows 7 Gadget—Part 3—Ranges*. Nov. 12, 2009, pp. 1-2.
Prish, Shahar, *Coding the Excel Services Windows 7 Gadget—Part 4—Fly-outs*. Nov. 13, 2009, pp. 1-2.
Prish, Shahar, *Discovery via the Excel Services REST APIs*. Oct. 29, 2009, pp. 1-2.
Prish, Shahar, *Excel Services REST APIs—the basics*. Nov. 2, 2009, pp. 1-2.
Prish, Shahar, *Excel Services REST limitations*. Nov. 17, 2009, p. 1.
Prish, Shahar, *Getting ranges via Excel Services REST as well as Charts and Discovery*. Oct. 30, 2009, pp. 1-2.
Prish, Shahar, *How to seamlessly embed data from Excel Services spreadsheets into Word*. Nov. 9, 2009. pp. 1-3.
Prish, Shahar, *Introducing the Excel Services Windows 7 Gadget*. Nov. 3, 2009, pp. 1-3.
Prish, Shahar, *Restplorer—visual exploration tool for Excel Services 2010 REST capabilities*. Feb. 17, 2010, pp. 1-3.
Prish, Shahar, *Showing Excel ranges in the Excel Services Gadget*. Nov. 4, 2009, pp. 1-2.
Prish, Shahar, *So what does REST on Excel Service look like*??? Oct. 28, 2009, pp. 1-2.
Prish, Shahar, *Welcome to the new Excel Services*! Oct. 27, 2009, p. 1.
Prish, Shahar, *What's coming to Cum Grano Salis this week*. Nov. 2, 2009, p. 1.
Prish, Shahar, *You can access arbitrary ranges via REST—here's the trick*. Dec. 29, 2009, p. 1.
Przybilski, "REST—Representational State Transfer," pp. 10.
Response to Chinese Notice on the First Office Action mailed Feb. 17, 2011, in Chinease Application No. 200880005232.9, filed Jun. 22, 2011, 16 pp.
Response to Chinese Notice on the First Office Action mailed Feb. 23, 2011, in Chinease Application No. 200880005008.X, filed Jun. 29, 2011, 14 pp.
Response to Final Office Action filed in U.S. Appl. No. 11/675,944, dated Dec. 28, 2009, 11 pp.
Response to Final Office Action mailed in U.S. Appl. No. 11/675,933, dated Feb. 1, 2010, 12 pp.
Response to Non-Final Office Action filed in U.S. Appl. No. 11/675,944, dated Jun. 11, 2009, 12 pp.
Response to Non-Final Office Action filed in U.S. Appl. No. 11/675,933, dated Jul. 14, 2010, 12 pp.
Roy Thomas Fielding, "Architectural Styles and the Design of Network-based Software Architectures", http://www.ics.uci.edu/-fielding/pubs/d issertation/field ing__dissertation .pdf, 2000, 180 pp.
"Security Guide", Retrieved at<<http://download.oracle.com/docs/cd/E 13159__0 1/osb/docs 1 Ogr3/security1 message__level__cust__auth.html>>,'Oracle, pp. 9.
Specifying Queries Using REST or the Browser. Http://msdn.microsoft.com/en-us/library/cc512431%28v=sql.100%29.aspx. Mar. 27, 2006, 10 pp.
T. Berners-Lee, et al., "Uniform Resource Identifier (URI): Generic Syntax", http://www.ietf.org/rfc/rfc3986.txt, Jan. 2005, 78 pp.
The, "Access Cloud Data with Astoria", 1998-2007, 1105 Media Inc., 4 pp.
Using ADO.NET Data Services ("Project Astoria"), Dec. 2007, Microsoft Corporation, pp. 43.
Voluntary Amendment filed in Chinese Application No. 200880005008.X, dated Apr. 19, 2010, 14 pp.
"Writing Advanced Web Services Applications", Retrieved at<<http://documentation.softwareag.com/webmethods1exx8/webservices/webServicesWrapper__w riteAppsAdv .htm, pp. 7.
Chinese 2nd Office Action in Chinese Application No. 200880005008.X, mailed Nov. 17, 2011, 7 pgs.
Final Office Action mailed in U.S. Appl. No. 11/675,933, dated Jun. 29, 2011, 19 pgs.
Non-Final Office Action mailed in U.S. Appl. No. 11/675,933, dated Apr. 14, 2010, 15 pgs.
U.S. Appl. No. 11/675,933, Amendment and Response filed Jul. 14, 2010, 12 pgs.
U.S. Appl. No. 12/032,640, Amendment and Response filed Sep. 7, 2011, 12 pgs.
U.S. Appl. No. 12/032,640, Office Action mailed Dec. 6, 2011, 24 pgs.
Chinese 3rd Office Action in Application 200880005008.X, mailed Feb. 22, 2012, 9 pgs.
European Search Report in Application 08730094.3, mailed May 31, 2012, 7 pgs.
Fielding, R. T. et al., "Principled design of the modern web architecture", Software Engineering, 2000, Proceedings of the 2000 International Conference on Jun. 4-11, 2000, Piscataway, NJ, USA, IEEE, pp. 407-416.
Laitkorpi, Markku et al., "A UML-based Approach for Abstracting Application Interfaces to REST-like Services", Reverse Engineering, 2006, WCRE '06, 13th Working Conference on Reverse Engineering, IEEE, PI, Oct. 1, 2006, pp. 134-146.
U.S. Appl. No. 11/675,944, Office Action mailed Apr. 24, 2012, 10 pgs.
Chinese Notice of Allowance in Application 200880005008.X, mailed Jun. 6, 2012, 4 pgs.
Discovery in Excel Services REST API—Published Date: May 2010; http://msdn.microsoft.com/en-us/library/ff394634.aspx; 5 pp.

(56) References Cited

OTHER PUBLICATIONS

Excel Services in SharePoint 2010 REST API Syntax—Microsoft Excel 2010—Published Date: Nov. 5, 2009; http://blogs.msdn.com/b/excel/archive/2009/11/05/excel-services-in-sharepoint-2010-rest-api-syntax.aspx; 7 pp.

Excel Web Access WebPart Cannot Display Excel WorkBook—Published Date: Sep. 9, 2009; http://social.msdn.microsoft.com/Forums/en-US/sharepointexcel/thread/808e7c28-5b15-473f-b132-66db2c03c5e1; 3 pp.

How to Display Charts from Pivot Table using Excel Web Access Web Part—Published Date: Mar. 24, 2009; http://social.msdn.microsoft.com/Forums/en-US/sharepointexcel/thread/993ab3ab-b852-47d4-aba5-9a16f1e092f3; 5 pp.

Excel Services Overview—Retrieved Date: Jun. 30, 2010; http://msdn.microsoft.com/en-us/library/ms546696%28office.12%29.aspx; 5 pp.

Automate the Retrieval of Embedded Objects from Asset Suite—Retrieved Date: Jun. 30, 2010; http://passportgeek.com/node/323; 4 pp.

Blakely, Jose, et al., "Next-Generation Data Access: Making the Conceptual Level Real", Jun. 1, 2006, pp. 1-21, Retrieved from the Internet on May 18, 2012 at: http://msdn.microsoft.com/en-us/library/aa730B66%2Bv=vs.B0%29.aspx.

Chinese Notice on Rejection in Chinese Application No. 200880005232.9, mailed May 9, 2012, 8 pgs.

Costello, Roger L., "Building Web Services the REST Way", xFront: Tutorials and Articles on XML and Web Technologies, Jan. 24, 2007, pp. 1-4, Retrieved from the Internet on May 18, 2012 at: http://www.xfront.com/REST-Web-Services.html.

European Supplemental Search Report in Application 08730095.0, mailed May 29, 2012, 8 pgs.

Japanese Notice of Allowance in Application 2009-550166, mailed Sep. 28, 2012, 6 pgs.

Japanese Notice of Rejection in Application 2009-550165, mailed Jun. 29, 2012, 4 pgs.

Prish, Shahar, "Welcome to the New Excel Services!", Cum Grano Salis, msdn, Oct. 27, 2009, pgs.

Yamamoto, Yohei, "Introduction to REST architecture style; method to correctly use HTTP and URI", Web+DB Press, vol. 32, pp. 101 to 107, Gijutsu-Hyohron Co., Ltd., Japan, May 25, 2006.

* cited by examiner

URL-FACILITATED ACCESS TO SPREADSHEET ELEMENTS

RELATED APPLICATIONS

This application claims priority to U.S. Provisional Patent Application No. 61/363,255, filed on Jul. 11, 2010, entitled "URL-FACILITATED ACCESS TO SPREADSHEET ELEMENTS," which application is hereby incorporated in its entirety herein.

BACKGROUND

Computer spreadsheet applications, such as EXCEL, available from MICROSOFT CORPORATION of Redmond, Wash., are popular mechanisms for keeping track of information. Users of spreadsheet applications often spend considerable time developing and implementing complicated logic within workbooks created using spreadsheet applications. Workbooks may contain valuable workbook elements, such as charts, tables, etc., that operate on data stored within or outside of the workbook. In addition, depending on the function of the workbook, data relied upon within a workbook is subject to being changed often. It is with respect to this environment that the present application is directed.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to providing URL-facilitated access to spreadsheet component elements. In embodiments, a client may discover and then access elements of an existing workbook directly through a uniform resource locator or uniform resource identifier (collectively, URL). In embodiments, a client may also provide, through a URL, value(s) for parameter(s) defined by the existing workbook. If value(s) are provided by the client, the workbook may be recalculated using the value(s) before a requested element of the workbook is returned to the client. In embodiments, the workbook is recalculated using a transient copy of the workbook, which is then discarded and the original workbook remains unchanged. Data changed in the workbook is automatically reflected in returned elements of the workbook when a request for such element is refreshed.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
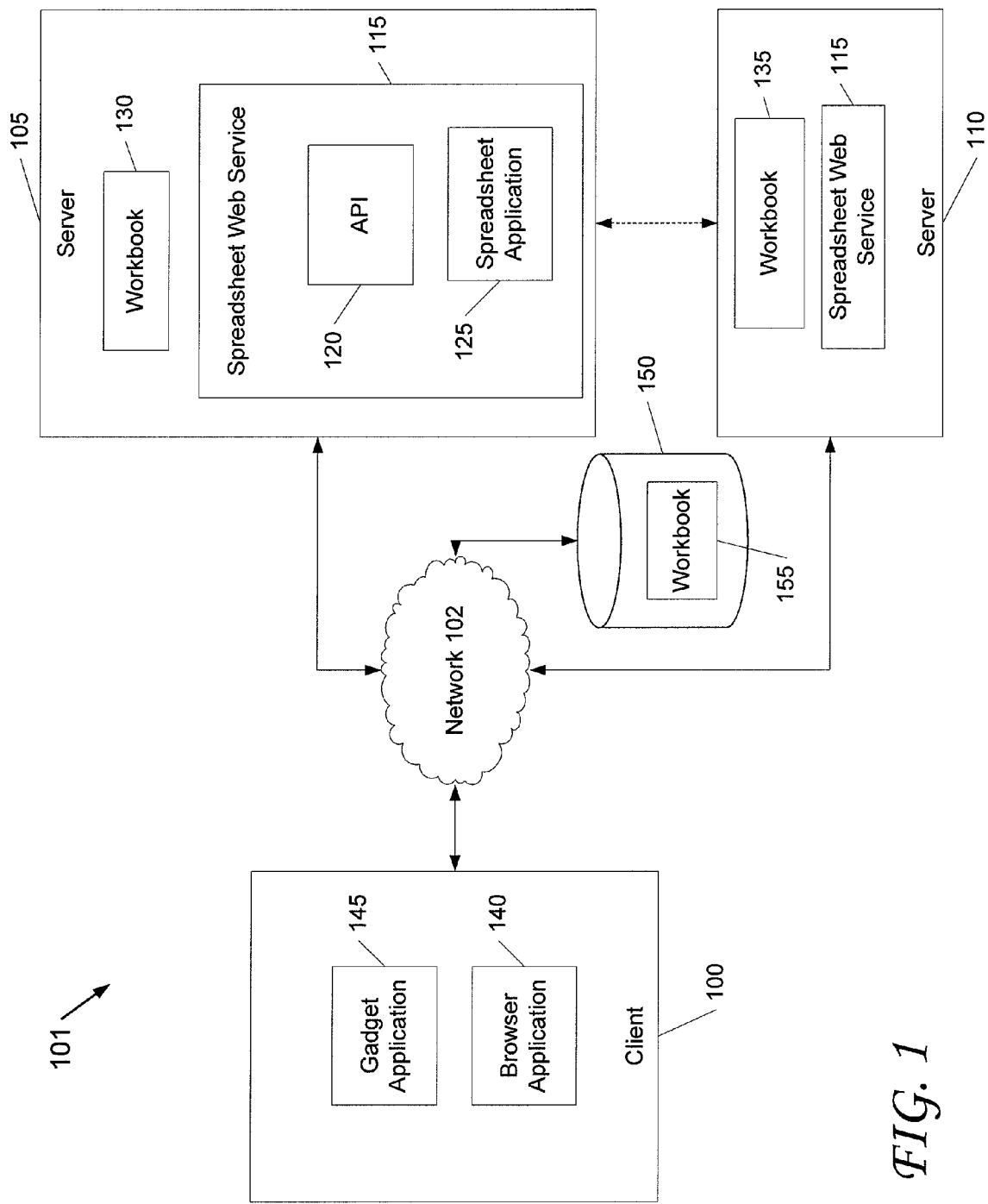
FIG. 1 illustrates an exemplary system for facilitating access to workbook elements as described in the present application.

Generally, program modules include routines, programs, components, data structures, and other types of structures that perform particular tasks or implement particular abstract data types. Moreover, those skilled in the art will appreciate that the present systems and methods may be practiced with other computer system configurations, including hand-held devices, multiprocessor systems, microprocessor-based or programmable consumer electronics, minicomputers, mainframe computers, and the like. The present systems and methods may also be practiced in distributed computing environments where tasks are performed by remote processing devices that are linked through a communications network. In a distributed computing environment, program modules may be located in both local and remote memory storage devices.

It should be appreciated that, according to embodiments described herein, the EXCEL spreadsheet application program from MICROSOFT CORPORATION of Redmond, Wash. is described along with its related web service, EXCEL SERVICES. It should be appreciated, however, that the various aspects of the present system and methods may be utilized with other spreadsheet application programs and services from other manufacturers. Moreover, although the inventive aspects described herein are presented in the context of a spreadsheet application program, it should be appreciated that other types of application programs may also be utilized to embody the various aspects of the present system and methods. It should also be appreciated that, as used herein, the words "first," "second," or similar terms are used for convenience and are not intended to limit the terms that they modify by implying a particular order, rank, position in a series, or importance.

Embodiments of the present application are directed to providing URL-facilitated access to spreadsheet component elements. In embodiments, a client may discover and then access elements of an existing workbook directly through a uniform resource locator or uniform resource identifier (collectively, URL). In embodiments, a client may also provide, through a URL, value(s) for parameter(s) defined by the existing workbook. If value(s) are provided by the client, the workbook may be recalculated using the value(s) before a requested element of the workbook is returned to the client. In embodiments, the workbook is recalculated using a transient copy of the workbook, which is then discarded and the original workbook remains unchanged. Data changed in the workbook is automatically reflected in returned elements of the workbook when a request for such element is refreshed.

In this way, embodiments of the present application allow client application developers to leverage the existing work and data in workbooks without requiring the developer to understand the underlying logic within the workbook. Moreover, because elements of the workbooks are accessed directly in the native workbook version, embodiments herein allow developers of workbooks to easily share data and logic within workbooks with other developers and client applications without knowledge of how to parse or publish such elements of the workbook.

FIG. 1 is a block diagram of a system 101 according to an embodiment of the present application. In embodiments, client 100 is operably connected to a network 102. Servers 105 and 110 are also operably connected to network 102. One or more of servers 105 and 110 may operate as an agent to implement a spreadsheet web service, such as EXCEL SERVICES offered by MICROSOFT CORPORATION of Redmond, Wash. It will be appreciated that servers 105 and 110 are depicted in FIG. 1 as examples, and more or fewer servers are possible. For example, spreadsheet web service 115 may be implemented on servers 105 and 110. Because spreadsheet web service 115 is a web service, it will be appreciated that it can be distributed and implemented on multiple servers, such as servers 105 and 110 (and additional servers not shown in FIG. 1). Spreadsheet web service 115 may comprise an application programming interface (API) 120 and a spreadsheet application 125, such as EXCEL, available from MICROSOFT CORPORATION of Redmond, Wash. Client 100 may act as an agent for one or more applications, such as browser 140 and gadget 145, to operate as requestors of services from the spreadsheet web service 115.

Particular workbooks (or spreadsheets), such as workbooks 130, 135, and 155, created using a spreadsheet application, such as spreadsheet application 125, may be stored on servers 105 and 110 and/or on separate storage devices, such as storage device 150. Storage device 150 is also operably connected to the network 102. Servers operably connected to the network 102, such as servers 105 and 110, may host an entry page for spreadsheet web service 115. In embodiments, client 100 and servers 105 and 110 agree upon a spreadsheet web service description (such as a Web Service Definition Language (WSDL) document) either through negotiation, publication on the network 102, or otherwise. The WSDL document may specify the address on network 102 of servers 105 and 110 and other servers hosting entry pages for spreadsheet web service 115. As will be appreciated by those of skill in the art, network 102 may comprise the Internet, an extranet, intranet, or any other suitable network. In addition, in embodiments, client 100 and servers 105 and 110 may be combined into a single physical machine.

In embodiments, client 100, servers 105 and 110, and storage device 150 communicate across network 102 using the AtomPub messaging protocol defined at RFC5023 (http://www.ietf.org/rfc/rfc5023.txt) and including URI and Payload Extensions defined by "Atom Publishing Protocol: Data Services URI and Payload Extensions," available from MICROSOFT CORPORATION (http://msdn.microsoft.com/en-us/library/dd541188 (PROT.10).aspx), each of which is hereby incorporated by reference as if fully set forth herein. In embodiments, messages are transmitted between and among client 100 and servers 105 and 110 using hypertext transfer protocol (HTTP) or hypertext transfer protocol secure (HTTPS). Further, embodiments herein comprise and utilize methods and systems described in the EXCEL SERVICES REST Protocol Specification (MS-ESREST), which is available from MICROSOFT CORPORATION, is incorporated in its entirety herein. Client 100, servers 105 and 110, and storage device 150 may also communicate directly through peer-to-peer protocols or otherwise.

In embodiments, client 100 directly accesses elements of a workbook, such as workbooks 130, 135, and 155 stored on servers 105 and 110 and storage device 150, using a URL. API 120 provides a uniform interface between clients (such as client 100) and servers (such as server 105) and sufficiently defines interactions between clients and servers such that each such interaction is self-contained. As such, the present embodiments may be considered to provide Representational State Transfer (REST)-type capabilities in a spreadsheet web service.

Figure 2:
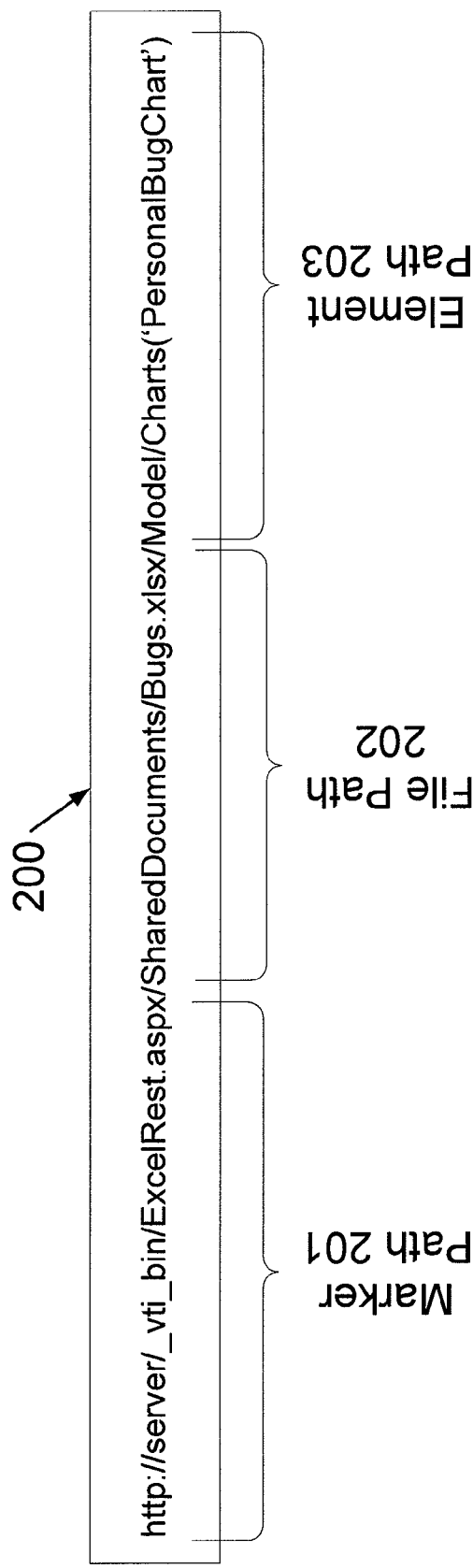
FIG. 2 illustrates an exemplary URL that may be used with respect the systems and methods of the present application.

An exemplary URL 200 according to present systems and methods is depicted in FIG. 2. In embodiments, the URL 200 comprises a marker path 201, a file path 202, and an element path 203.

The first section 201 of the exemplary URL 200 provides a "marker path" to a web services page, such as an ".aspx" page that acts as an entry point to a spreadsheet web service. For example, MICROSOFT CORPORATION of Redmond, Wash. offers a spreadsheet application known as EXCEL and a web service known as EXCEL SERVICES. In embodiments, the entry page to a web service offering REST-type capabilities within EXCEL SERVICES may be provided by the following URL: "http://server/_vti_bin/EXCELRest.aspx." In embodiments, the marker path comprises a URL to a spreadsheet web services entry page hosted on a server, such as server 105. In embodiments, the "_vit_bin/EXCELRest.aspx" portion of the marker path can be omitted, and the exemplary URL 200 may comprise a direct path to the file path 202 and element path 203.

The second section 202 of the exemplary URL 200 shown in FIG. 2 provides a "file path," which identifies the file (such as workbook 130 in FIG. 1) that contains the workbook element sought by the client. For example, if workbook 130 is an EXCEL file named "Bugs.xlsx" and was located in a folder called "Shared Documents," the file path for that workbook 130 would be "/Shared Documents/Bugs.xlsx," as shown in the example URL 200.

The third section 203 of the exemplary URL 200 shown in FIG. 2 provides an "element path." This is the path within the targeted workbook to the element of the workbook sought by the client. For example, if the targeted workbook, e.g., workbook 130, included a chart named "PersonalBugChart," the element path for that element of workbook 130 may comprise: "/Model/Charts('PersonalBugChart')."

In embodiments, a target workbook, such as workbook 130, may comprise various elements, including, for example, charts, tables, pivot tables, and cell ranges. For example, the creator of spreadsheet 130 may use various functionality within the workbook 130 to manipulate data that is contained within cells of the workbook or retrieved externally from the workbook to create such elements of the workbook. According to the present systems and methods, a client 100 may discover the available elements of the workbook and gain access to such elements by use of URLs dictated by API 120.

For example, assume workbook 130 includes charts, tables pivot tables, and named cell ranges. In embodiments, API 120 defines available element paths (such as the third section 203 of the exemplary URL shown in FIG. 2) that are supported by the spreadsheet web service. For example the element paths may be used to discover types of available elements and specific lists of elements of a particular type as well as to obtain the elements themselves. For example, one element path may be defined by API 120 that returns the "model" for the workbook. The model for the workbook may include a set of element types available in a particular workbook. In a workbook containing charts and tables but no pivot tables or named cell ranges, a client navigating to the "model" element path may receive a list consisting of: "charts" and "tables." In other embodiments, the model is not workbook-specific and is defined by the element types that are supported by the web service via the API. As such, the model for a particular workbook may include, e.g., pivot tables and named cell ranges, even no such elements exist for that particular workbook.

In embodiments, URLs may also be defined for lists of elements having a particular element type. For example, a client 100 may navigate to an element path comprising "/Model/Charts," and the server 105 will return a list of all charts available in the specified workbook, such as workbook 130. In this way, a client, such as client 100, can discover the available element types and available elements of a particular type prior to requesting that a particular element of a workbook be returned to the client. In embodiments, less than all charts available may be returned. For example, an author of the workbook 130 may set a subset of charts to be returned by the server 105 in response to navigation by the client to the "/Model/Charts" element path.

In embodiments, lists of available elements and the elements themselves may be considered conceptually different data structures. For example, with respect to the entity data model described in the Conceptual Schema Definition File Format protocol specification (MC-CSDL) available from MICROSOFT CORPORATION (available at http://msdn.microsoft.com/en-us/library/dd541474(PROT.10).aspx, and incorporated by reference herein in its entirety), data structures that comprise lists of available elements (such as the workbook model, or the lists of available charts, tables, pivot tables, ranges, etc.) are considered "entity sets," while actual elements of the target workbook, such as a table, a pivot table, a range, etc., are considered "entities." For example, in embodiments, the mapping between workbook (or spreadsheet) data structures and the entity data model of MC-CSDL may be described by Table 1, below:

TABLE 1

| Spreadsheet data structure | Description | Entity Data Model term |
|---|---|---|
| Model | Information about the spreadsheet. | EntitySet |
| Ranges | The list of ranges that are exposed by the spreadsheet. | EntitySet |
| Charts | The list of charts that are exposed by the spreadsheet | EntitySet |
| Tables | The list of tables that are exposed by the spreadsheet. | EntitySet |
| PivotTables | The list of pivot tables that are exposed by the spreadsheet. | EntitySet |
| Range | A range from the spreadsheet. | Entity |
| Table | A table from the spreadsheet | Entity |
| PivotTable | A PivotTable from the spreadsheet | Entity |
| Chart | A chart from the spreadsheet | None, Returned as a binary response to the request. |

In addition to element paths, the API 120 may also define the format(s) in which the resource at that element path may be returned to the client. Particular element paths may include a default format that is used to return the relevant element of the workbook if no other format is specified in the element path. For example, although other element paths and formats are possible, API 120 may define supported element paths and formats as shown in Table 2, below:

TABLE 2

| Element Path | Format | Example | Notes |
|---|---|---|---|
| /Model | atom (default) | | This returns an ATOM feed with the types of resources supported by the workbook (e.g., Ranges, Charts, PivotTables and Tables). |
| /Model | workbook | /Model?$format=workbook | The binary workbook (the xlsx/xlsb/xlsm) itself. |
| /Model/Ranges | atom (default) | /Model/Ranges /Model/Ranges?$format=atom | An ATOM feed listing all the named ranges in the workbook. |
| /Model/Ranges('[Name]') | html (default) | /Model/Ranges('MyRange') /Model/RangeS('MyRange')?$format=html | An HTML fragment for the requested range. |
| /Model/Ranges('[Name]') | atom | /Model/Ranges('MyRange')?$format=atom | An ATOM entry containing an XML representation of the data within the range. |
| /Model/Charts | atom (default) | /Model/Charts /Model/Charts?$format=atom | An ATOM feed listing all the charts in the workbook. |
| /Model/Charts('[Name]') | image (default) | /Model/Charts('MyChart') /Model/Charts('MyChart')?$format=image | An image (PNG form) of the chart. |
| /Model/Tables | atom (default) | /Model/Tables /Model/Tables?$format=atom | An ATOM feed listing all the available tables in the workbook. |
| /Model/Tables('[Name]') | html (default) | /Model/Tables('MyTable') /Model/Tables('MyTable')?$format=html | An HTML fragment for the requested table. |

TABLE 2-continued

| Element Path | Format | Example | Notes |
| --- | --- | --- | --- |
| /Model/Tables('[Name]') | atom | /Model/Tables('MyTable')?$format=atom | An ATOM entry containing an XML representation of the data within the table. |
| /Model/PivotTables | atom (default) | /Model/PivotTables /Model/PivotTables?$format=atom | An ATOM feed listing all the available PivotTables in the workbook. |
| /Model/PivotTables('[Name]') | html (default) | /Model/PivotTables('MyPT') /Model/PivotTables('MyPT)?$format=html | An HTML fragment for the requested PivotTable. |
| /Model/PivotTables('[Name]') | atom | /Model/PivotTables('MyPT')?$format=atom | An ATOM entry containing an XML representation of the data within the PivotTables |

By defining supported element paths and formats, the API 120 simplifies direct access to elements of a workbook, such as workbooks 130, 135 and 155. For example, assume that workbook 130 is named "Sales.xlsx" and is located in a "Cycles" folder on server 105. Sales.xlsx contains a Table named "SalesProjections." Server 105 hosts an entry point for spreadsheet web service 115 in the form of an .aspx page: "EXCELRest.aspx." Assume also that the user prefers that the table is returned in an html format. A user of client 100 can gain direct access to the SalesProjection table in a workbook 130 simply by pointing browser 140 to the following exemplary URL: http://server/_vti_bin/EXCELRest.aspx/Cycles/Sales.xlsx/Model/Tables('SalesProjections')?format=html. Alternatively, a gadget 145 (or other application on client 100) may fetch the SalesProjection table in workbook 130 by simple HTTP GET request, e.g.: GET/_vti_bin/EXCELRest.aspx/Cycles/Sales.xlsx/Model/Tables('SalesProjections')?format=html. In either case, server 105 will return the HTML code for the SalesProjections table in workbook 130 to the requesting application on client 100.

In embodiments, the server hosting spreadsheet web service 115 with which the client 100 communicates via network 102 need not be the same server that stores the workbook from which the client seeks to obtain an element. For example, client 100 may use a URL containing a marker path that specifies server 110 and a file path that specifies workbook 130 stored on server 105 or workbook 155 stored on storage device 150. So long as the workbook specified by the file path is in a location that is accessible by server 110, web service 115, which is distributed across servers 105 and 110 (and possibly other servers) may permit the server 110 to return the requested workbook element(s) to the client 100.

In addition, the creator of the workbook 130 may declare within the workbook certain parameters that users of the workbook may change to affect calculations within the workbook 130. In embodiments, settable parameters may be discovered in a similar manner as available workbook elements. For example, a user may direct a browser application, such as browser application 140, to a URL to return all settable parameters for a particular workbook or workbook element. Continuing with the "Sales.xlsx/Model/Tables('SalesProjections')" example set forth above, the URL to effect a return of settable parameters for the "SalesProjections" table in the "Sales.xlsx" workbook may comprise, e.g.: http://server/_vti_bin/EXCELRest.aspx/Cycles/Sales.xlsx/Model/Tables ('SalesProjections')/Parameters. In embodiments, the settable parameters requested and returned may be for the entire workbook 130, not just a particular workbook element.

Figure 3:
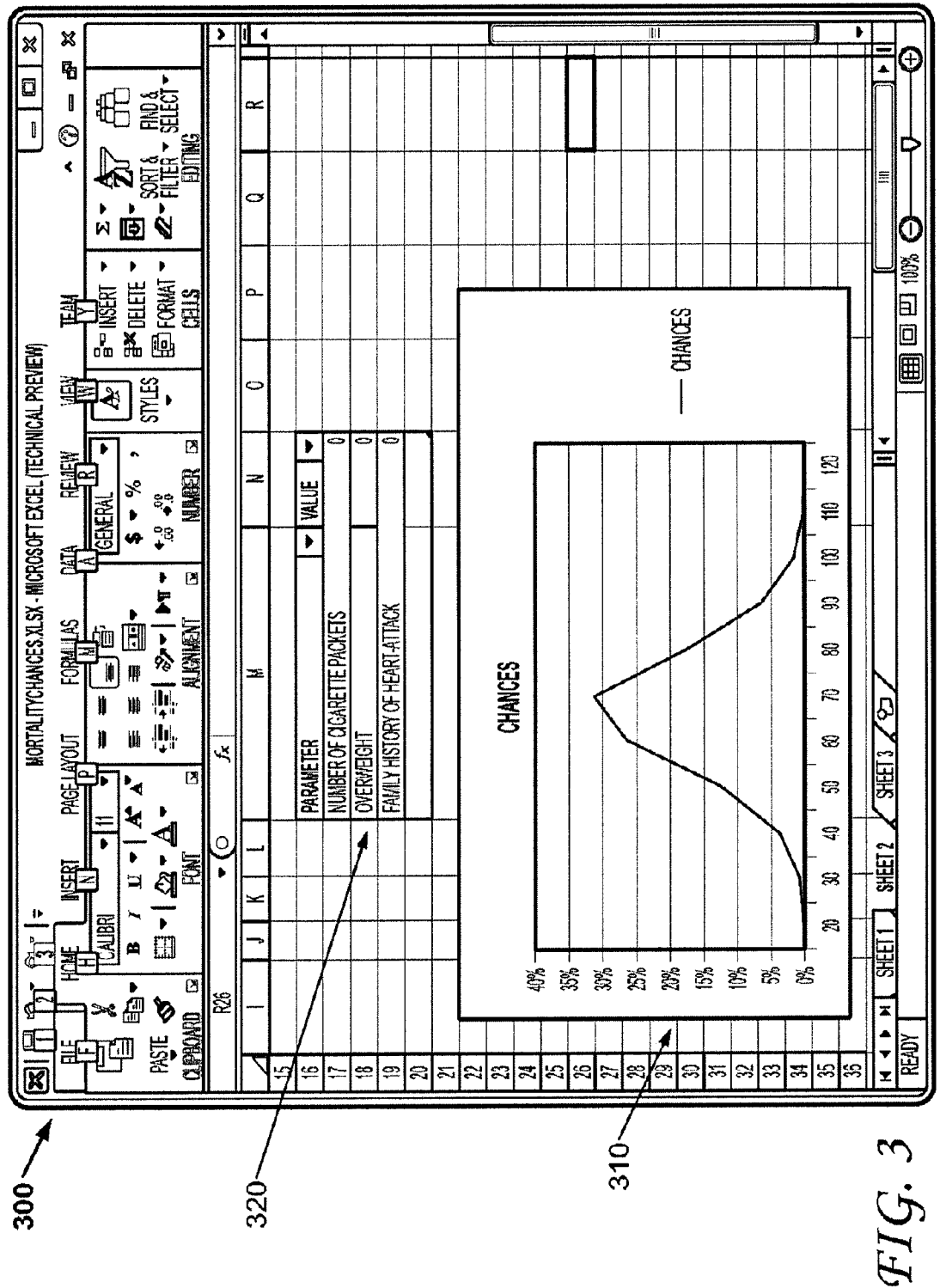
FIG. 3 illustrates a workbook element including settable parameters that may be used with respect to the systems and methods of the present application.

FIG. 3 depicts an exemplary workbook 300 created with a spreadsheet application, such as EXCEL available from MICROSOFT CORPORATION of Redmond, Wash. The chart 310 depicted in workbook 300 illustrates the chances of a person dying at a particular age given a set of values for particular parameters 320. In this exemplary embodiment, the parameters include "Number of cigarette packets," "Overweight" and "Family history of heart-attack." In this example, the "Number of cigarette packets" parameter is settable to any positive number. The other two parameters are settable as binary variables—1 meaning true and 0 meaning false. As the workbook 300 exists in the spreadsheet application, the chart 310 depicts the chances of a person dying at a particular age assuming that the person smokes zero packs of cigarettes per week, is not overweight, and does not have a family history of heart attacks.

Figure 4:
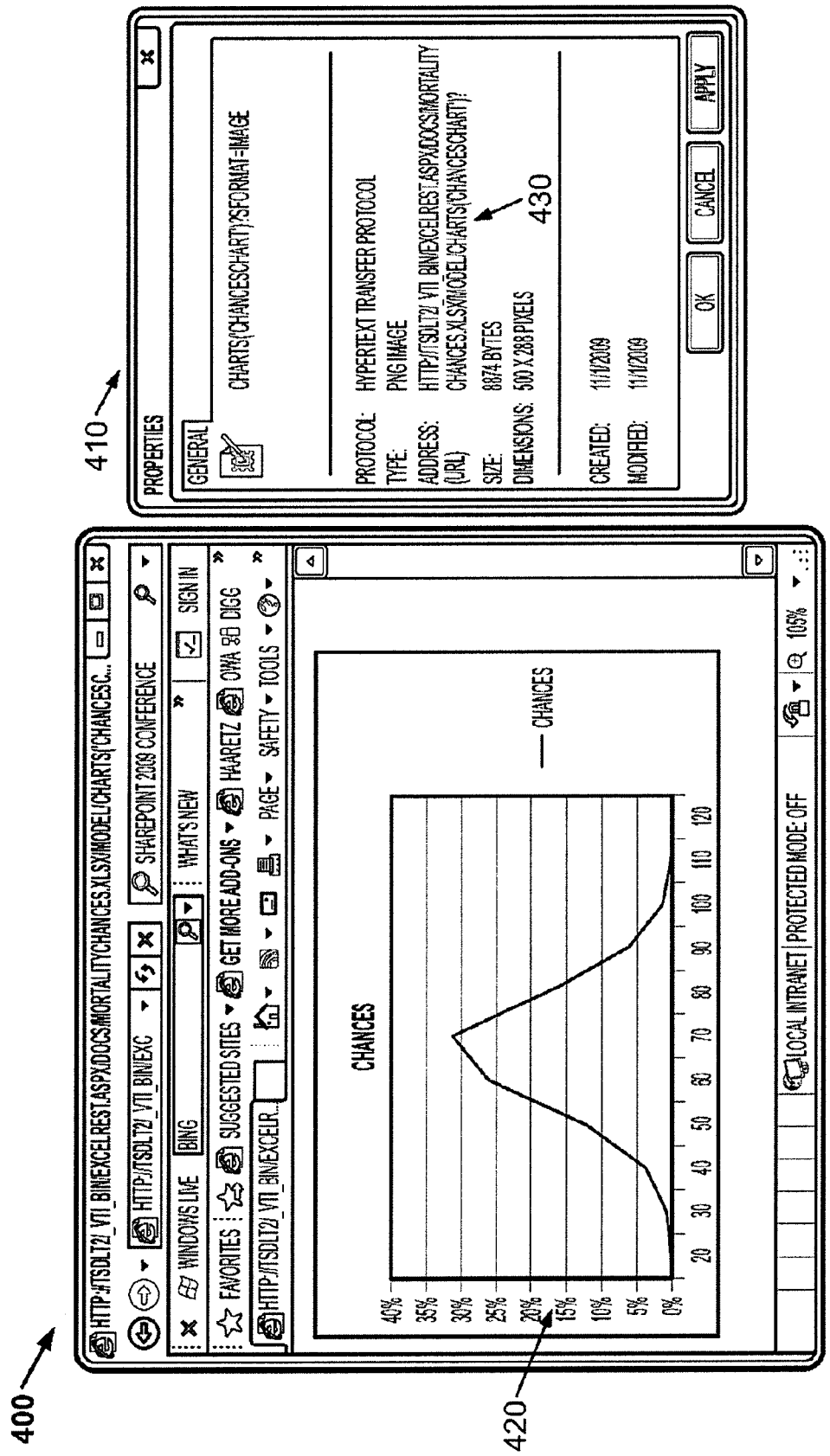
FIG. 4 illustrates a workbook element retrieved according to the systems and methods of the present application.

FIG. 4 depicts a browser window 400 and a properties window 410 displaying properties of the page displayed in browser window 400. Browser window 400 may be generated by a browser application (such as browser application 140) and displays a chart 420 that is identical to chart 310 shown in FIG. 3. As shown in properties window 410, the chart was retrieved by directing the browser to the following URL 430: http://tsdlt2/_vti_bin/EXCELRest.aspx/Docs/MortalityChances.xlsx/Model/Charts('Chances Chart')?. Because the URL does not include any specified parameter value or format, the chart 420 is returned in the default format (in this case, a PNG image) with the parameter values as they are found in the native chart 310 depicted in FIG. 3.

Figure 5:
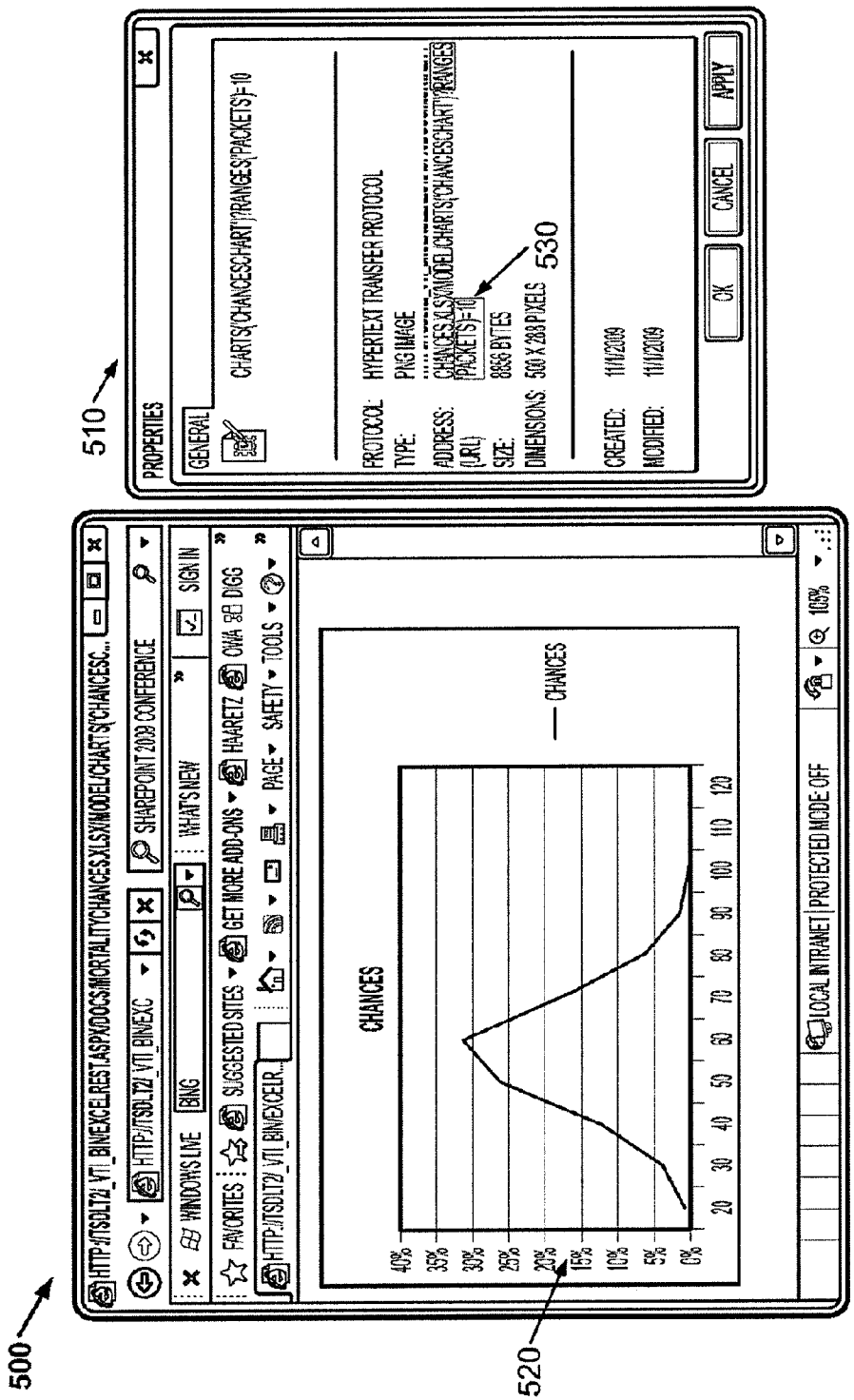
FIG. 5 illustrates a workbook element retrieved after being recalculated with supplied parameter values according to the systems and methods of the present application.

FIG. 5 illustrates the result of specifying parameter values in the URL used to request the chart. FIG. 5 depicts a browser window 500 and a properties window 510 displaying properties of the page displayed in browser window 500. Browser window 500 may be generated by a browser application (such as browser application 140) and displays a chart 520. As shown in the properties window 510, the chart was received by directing the browser to the following URL 530: http://tsdlt2/_vti_bin/EXCELRest.aspx/Docs/MortalityChances.xlsx/Model/Charts('ChancesChart')?Ranges('Packets')= 10. URL 530 is identical to URL 430 except that it includes a value for the "Number of cigarette packets" parameter (named "Packets") that was defined in the workbook 300 as it exists natively in the spreadsheet application. In this case the value for the "Packets" parameter is set at "10" via the URL 530 used to request the chart 520. In this case, the chart 520 is different from chart 310 in that it reflects that a person is likely to die younger if he or she smokes ten packets of cigarettes per week.

In embodiments, the server returning the requested workbook element creates a transient copy of the workbook before recalculating using parameters specified by the URL request. For example, with reference to FIG. 1, assume browser application 140 is redirected to a URL identical to URL 530 in FIG. 5: http://tsdlt2/_vti_bin/EXCELRest.aspx/Docs/Mortality-Chances.xlsx/Model/Charts('ChancesChart')?Ranges ('Packets')=10. Assume also that the workbook "Mortality-Chances" is stored in native form on storage device 150 with all parameters set to zero (as shown in FIG. 3). If the server "tsdlt2" is server 105, then spreadsheet web service 115 on server 105, in this embodiment, requests a copy of the workbook 155 from storage device 150 via network 102. Using spreadsheet application 125, the server 105 may recalculate the copy of workbook 155 using the parameter value designated in the URL 530 ("Ranges('Packets')=10"). The requested "ChancesChart" element of workbook "Mortality-Chances.xlsx" is recalculated using the parameter value 10 for the "Packets" parameter. The recalculated "ChancesChart" element is provided to the browser application 140, and the recalculated copy of the workbook 155 is discarded (or not persistently saved) by server 105. In embodiments, the workbook 155 stored at storage device 150 remains unchanged by the supplied parameter in the URL 530. In this manner, the developer of a workbook, such as workbook 155, can create a "standard" or "generic" set of parameter values that will not be changed each time a client requests that the workbook be recalculated.

Although FIGS. 3, 4 and 5 depict the use of a browser application, such as browser application 140, to retrieve workbook elements, any client application can be used. For example, a client 100 may include a gadget application 145 that provides a specific user interface for interacting with spreadsheet web service 115 and displaying elements returned by spreadsheet web service 115. In exemplary embodiments, the gadget application 145 may include a user interface to display discovered element types, elements, and parameters and to accept selection of elements and element types and input of parameter values that are automatically then translated into the appropriate URL to retrieve the desired workbook element(s). Moreover, the retrieval of workbook elements may be programmatic (as opposed to user-initiated) and may be performed by any client application without the need for user input. In embodiments, client applications, themselves, may be servers.

Once requested workbook element(s) have been received at the client 100, the data may be refreshed. For example, if the logic or data underlying the targeted workbook change, the retrieved element (such as a chart, table, etc.) may be affected. Clients can ensure that they receive updated workbook elements by requesting that the workbook element be resent. In embodiments, this can be accomplished by a user refreshing a request for a particular URL in a browser (as discussed above). This can also be accomplished programmatically. A client application may be programmed, for example, to request the desired workbook element on a periodic or other basis, with or without user intervention.

Client 100 may also designate a format in which the server is required to return the desired element. The desired format may also be communicated in the URL used to request the workbook element. As shown in Table 2 above, formats may include, inter alia, image (such as a portable network graphic (PNG) image), atom (such as an ATOM feed defined by RFC 5023, available from http://www.ietf.org/rfc/rfc5023.txt (October 2007) and extensions thereto available at http://msdn.microsoft.com/en-us/library/dd541188 (PROT.10).aspx), and html (specifying a HyperText Markup Language (HTML) fragment to be returned for the requested workbook element). HTML fragments include lines of text that adhere to HTML tag rules, as described in HTML, but do not have processing instructions or any other type of header information. Client applications, such as browser 140 and gadget 145 may be programmed to extract the desired information from the returned, formatted workbook element. For example, a client application may traverse an HTML fragment or extensible markup language (XML) (returned as part of an ATOM feed) to display the element in a manner dictated by the client application.

As discussed, a variety of different workbook element types may be retrieved from a workbook, including charts, tables, pivot tables, and ranges. In embodiments, a range comprises a range of cells in a workbook. In embodiments, all of the elements that are available to be retrieved pursuant to the present systems and methods may be made available by the creator of the workbook. For example, a workbook creator may create "named ranges" in the workbook by marking such ranges as being available to a user when the workbook is accessed by a server. Such designation of named ranges (and available charts, tables, pivot tables, etc.) may be made by numerous methods, including in metadata associated with the workbook or otherwise.

Figure 6:
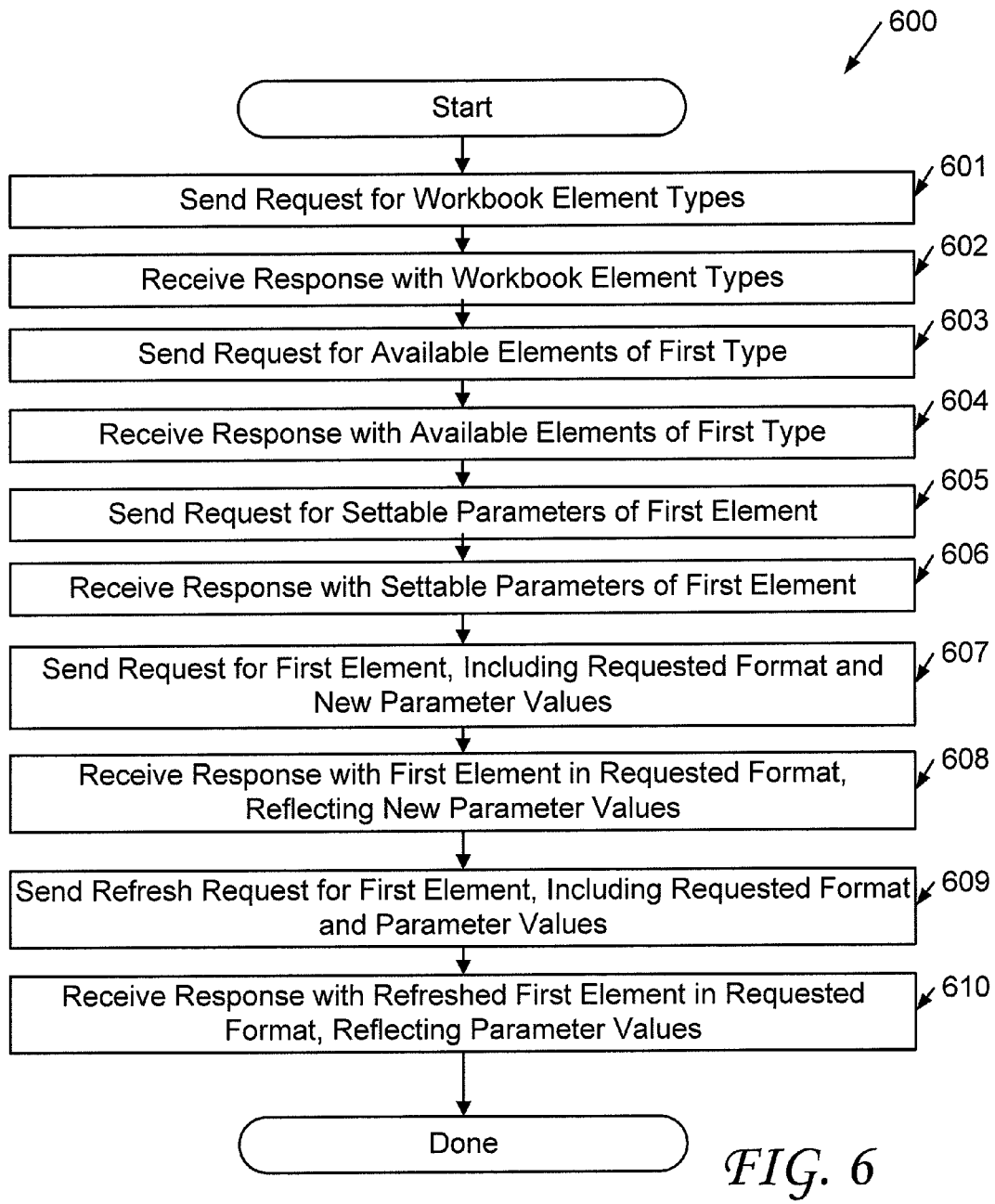
FIG. 6 illustrates a method for obtaining a workbook element according to the systems and methods of the present application.

Referring now to FIG. 6, an illustrative routine 600 will be described illustrating a process pursuant to the present application. When reading the discussion of the routines presented herein, it should be appreciated that the logical operations of various embodiments of the present application are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in the present figures and specification, and making up the embodiments of the present application are referred to variously as operations, structural devices, acts, steps, or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

FIG. 6 depicts an exemplary routine that may be performed, in embodiments, by a client, such as client 100, in obtaining a workbook element using a URL. At operation 601, a request for workbook element types is sent. As described above, a request for workbook element types may be sent, e.g., by redirecting a browser application to a URL for the "model" of a particular workbook. With respect to the example discussed with respect to FIGS. 3, 4, and 5, a request 601 for workbook element types may comprise sending the following HTTP request: GET tsdlt2/_vti_bin/EXCELRest.aspx/Docs/MortalityChances.xlsx/Model. In embodiments, as discussed, the request for workbook element types includes a file path (Docs/MortalityChances.xlsx) and an element path (Model). In embodiments, the request 601 may include a format according to which the workbook element types are to be returned. For example, an HTTP request including a format may comprise: GET tsdlt2/_vti_bin/EXCELRest.aspx/Docs/MortalityChances.xlsx/Model?$format=atom.

The routine proceeds to operation 602, where a response is received that contains the workbook element types. For example, the response may include an ATOM feed containing all of the element types available in the specified workbook. Examples of available element types may include, in embodiments, charts, tables, pivot tables, and ranges.

At operation 603, a request is sent for available elements of a first type. For example, after receiving a list of available element types, a client application (such as gadget application 145) receiving the list of available element types may present such list to a user. The user (or the application itself) may then select a first of such available element types (e.g., "charts"). In embodiments, more than one element type may be requested. The client application may then, in embodiments, generate a request to determine what particular charts are available in the workbook. This request may also take the form of an HTTP GET request and may specify a format for data to be returned, e.g.: GET tsdlt2/_vti_bin/EXCELRest.aspx/Docs/Mortality-Chances.xlsx/Model/Charts?$format=atom.

Proceeding to operation 604, a response is received including available elements of the first type. Continuing with the example above, the response may comprise an ATOM feed including a list of all available charts in the "MortalityChances.xlsx" workbook.

At operation 605, a request for settable parameters of the first element is sent. In embodiments, the request may again take the form an HTTP GET request that specifies a path to retrieve settable parameters. For example, continuing with the above example, the request may take the form of, e.g.: GET tsdlt2/_vti_bin/EXCELRest.aspx/Docs/Mortality-Chances.xlsx/Model/Parameters?(format=atom). In embodiments, the API at the server may define this request to require the return of settable parameters for the entire workbook. In other embodiments, the request may be made specific to parameters that affect a particular workbook element, e.g.: GET tsdlt2/_vti_bin/EXCELRest.aspx/Docs/Mortality-Chances.xlsx/Model/Charts('ChancesChart')/Parameters?$format=atom. In embodiments, this request may be interpreted according to a spreadsheet web service API (such as API 120) as requesting the settable parameters for only the "ChancesChart" within the "MortalityChances.xlsx" workbook. As used herein, requesting parameters for a particular element may comprise requesting parameters for the entire workbook, including the parameters for the particular element.

Proceeding to operation 606, a response is received including the requested settable parameters. For example, as discussed with respect to FIGS. 3, 4, and 5, one settable parameter affecting the "ChancesChart" element in the "MortalityChances.xlsx" workbook may be the number of "packets" of cigarettes someone smokes. In embodiments, the settable parameters may be presented to a user (e.g., via an input box on a web page) or exposed to a client application that programmatically provides values to for the parameters.

At operation 607, a request is sent for the first element. In embodiments, the request includes a network-traversable path to the first element, a requested format for results to be returned, and new parameter values for one or more settable parameters affecting the first element. For example, continuing with the example above, a request may take the form of GET tsdlt2/_vti_bin/EXCELRest.aspx/Docs/Mortality-Chances.xlsx/Model/Charts('ChancesChart')?$format=image&Ranges('Packets')=10. Pursuant to the applicable API (such as API 120), this may be interpreted as a request for the "ChancesChart" provided in image form after having been recalculated with a settable "Packets" parameter equal to 10. At operation 608, the first element is received in the requested format and reflecting the parameter value supplied in the request. The received first element may then be used by the requesting client, client application, or user for display or further calculation, as needed.

Proceeding to operation 609, a refresh request is sent for the first element. The refresh request can be identical to the request sent in operation 607 or contain a request for a different format or different parameter value. Even an identical request may still result in a different result being returned as data or logic underlying the first element in the workbook may have changed. In this way, making periodic and identical refresh requests will ensure that the received first element is kept up to date with any changes in the workbook. For example, a client application may display on a desktop a first element (e.g., a chart) for which the underlying data is constantly in flux, such as the number of software "bugs" for which a particular client-application user is responsible. As bugs are added or deleted from the underlying workbook, the client application may be programmed to periodically and consistently send refresh requests for the first element and display the newly refreshed first element when received so that the displayed chart of software bugs remains in sync with the changing data underlying the workbook. In other embodiments, refresh request may be initiated by a user, such as by clicking the refresh button in a browser application, such as browser application 140.

Proceeding to operation 610, the refreshed first element is received. As discussed, the refreshed first element received may be identical to the first element received in operation 608 or may reflect a different requested format or different supplied parameter value. In addition, the refreshed first element may have changed due to changes to underlying data or logic in the workbook, even though the request made in operation 609 may be identical to the request made in operation 607.

In embodiments, the client application (or client-application user) may already be aware of the settable parameters for a particular spreadsheet and may already be familiar with the element types and elements available in a spreadsheet. Accordingly, in embodiments, one or more of the steps 601 through 606 may be skipped for a given interaction.

Figure 7:
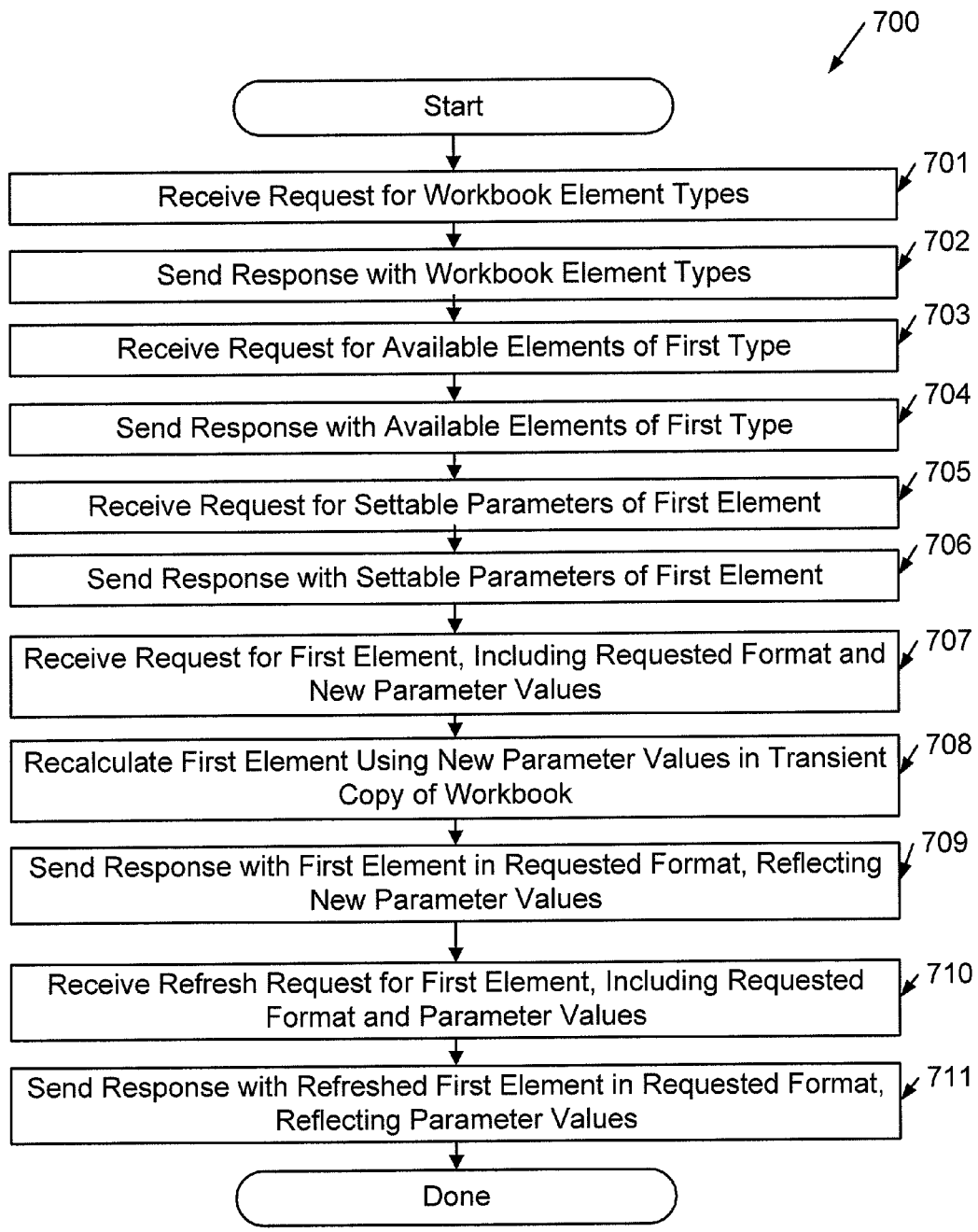
FIG. 7 illustrates a method for providing a workbook element according to the systems and methods of the present application.

Referring now to FIG. 7, an illustrative routine 700 will be described illustrating a process pursuant to the present application. At operation 701, a request is received for element types of a particular workbook. In embodiments, the request is received at a server, such as server 105. In embodiments, the server, such as server 105, provides an API, such as API 120, that defines network-traversable paths to workbook elements and to information about workbook elements. For example, the API may define the format of a request for workbook element types, such as the request received at operation 701, to include a file path and an element path, wherein the element path is to the "model" for the workbook. For example, the API may define the format for a request for workbook element types of a workbook "Mortality Chances" located in a "Docs" folder accessible through a web services entry point at "http://tsdlt2/_vti_bin/EXCELRest.aspx" to be: GET tsdlt2/_vti_bin/EXCELRest.aspx/Docs/MortalityChances.xlsx/Model/.

Flow proceeds to operation 702, wherein a response is sent including the element types of the workbook. In embodiments, a server, such as server 105, obtains the model for the workbook in accordance with behaviors defined by an API, such as API 120, and returns the workbook element types for the workbook.

At operation 703, a request is received for available elements of a first type. In embodiments, a server may receive this request and return (at operation 704) all available elements of the first type. For example, the following request received at operation 703 (GET tsdlt2/_vti_bin/EXCELRest.aspx/Docs/MortalityChances.xlsx/Model/Charts?$format=atom) may result in the server returning 704 to a requesting client application an ATOM feed of all charts available in the "MortalityChances.xlsx" workbook.

At operation 705, a request for settable parameters for a first element is received. For example, the request may include a request for all settable parameters of a first element (e.g., a particular chart, "ChancesChart"): GET tsdlt2/_vti_bin/EXCELRest.aspx/Docs/MortalityChances.xlsx/Model/Charts('ChancesChart')/Parameters?$format=atom. The request may also comprise a request for all settable parameters of the workbook as a whole, including settable parameters of the first element. At operation 706, a response is sent with settable parameters of the first element (or of the entire workbook, including settable parameters of the first element). In embodiments, a server, such as server 105, that receives the request at operation 705 may, according to a controlling API, extract from the workbook the requested settable parameters and send them (operation 706) in a requested (or default) format to a requesting client application.

At operation 707, a request for the first element is received. In embodiments the request includes a requested format and parameter value(s) for particular settable parameter(s), e.g.: GET tsdlt2/_vti_bin/EXCELRest.aspx/Docs/MortalityChances.xlsx/Model/Charts('ChancesChart')?$format=image&Ranges('Packets')=10. At operation 708, the first element is recalculated using the parameter value(s) (if any) from the request received at operation 707. In embodiments, a server, such as server 105, may recalculate the first element using a spreadsheet application (such as spreadsheet application 125). In embodiments, the recalculation operation includes creating a transient copy of the workbook and recalculating the first element with the supplied parameter value(s) using the transient copy. In embodiments, the transient copy is not saved in persistent storage and may be discarded following operation 709. For example, the transient copy may be placed in a recycle bin, be made subject to trash collection, or otherwise be left unprotected while the original workbook is unchanged. In this manner, a main (or original or native) copy of the workbook can remain generic without being affected by one or more user's requests to recalculate using supplied settable parameter values.

At operation 709, a response is sent with the requested first element calculated according to any supplied settable parameter value(s) and provided in a requested (or default) format. For example, if the request received at operation 708 comprises GET tsdlt2/_vti_bin/EXCELRest.aspx/Docs/MortalityChances.xlsx/Model/Charts('ChancesChart') ?$format=image&Ranges('Packets')=10, the response at operation 709 may comprise a chart, in image format, that has been recalculated after setting the "Packets" parameter value equal to 10.

In embodiments, a refresh request may be received at operation 710. In embodiments, the refresh request is treated similarly to the originally received request at operation 707. The refresh request may include a requested format and parameter value(s) that may or may not be the same as the format and parameter values in the request received at operation 707. The first element may be recalculated again using a transient copy of the workbook (not shown) and returned in a response (operation 711) using the format and parameter value(s) included in the refresh request.

In embodiments, if a request received at operations 701, 703, 705, 707, or 710 includes a supported requested format, the requested information may be returned in that format. If the requested format is not supported or is not present in the request, a default format may be used.

Figure 8:
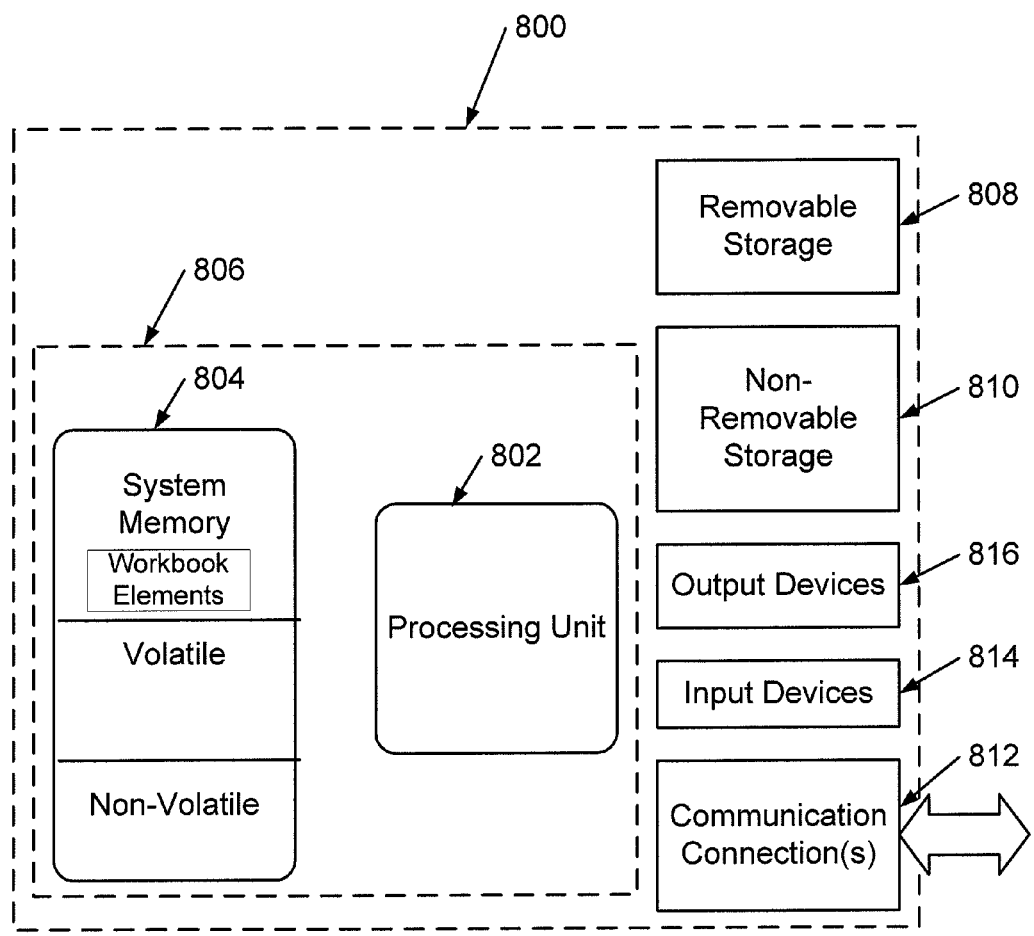
FIG. 8 illustrates an exemplary operating environment usable with the systems and methods of the present application.

FIG. 8 illustrates one example of a suitable operating environment 800 in which a software embodiment may be implemented. In embodiments, client 100, servers 105 and 110, and storage device 150 may all comprise operating environments similar to operating environment 800. This is only one example of a suitable operating environment and is not intended to suggest any limitation as to the scope of use or functionality. Other well known computing systems, environments, and/or configurations that may be suitable for use include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

In its most basic configuration, operating environment 800 typically includes at least one processing unit 802 and memory 804. Depending on the exact configuration and type of computing device, memory 804 (storing, among other things, workbook elements calculated as described herein) may be volatile (such as RAM), non-volatile (such as ROM, flash memory, etc.), or some combination of the two. This most basic configuration is illustrated in FIG. 8 by dashed line 806. Further, environment 800 may also include storage devices (removable, 808, and/or non-removable, 810) including, but not limited to, magnetic or optical disks or tape. Similarly, environment 800 may also have input device(s) 814 such as keyboard, mouse, pen, voice input, etc. and/or output device(s) 816 such as a display, speakers, printer, etc. Also included in the environment may be one or more communication connections, 812, such as LAN, WAN, point to point, etc.

Operating environment 800 typically includes at least some form of computer readable media. Computer readable media can be any available media that can be accessed by processing unit 802 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 800 may be a single computer operating in a networked environment using logical connections to one or more remote computers. The remote computer may be a personal computer, a server, a router, a network PC, a peer device or other common network node, and typically includes many or all of the elements described above. The logical connections may include any method supported by available communications media. Such networking environments are commonplace in offices, enterprise-wide computer networks, intranets and the Internet.

Although the present systems and methods have been described in connection with various exemplary embodiments, those of ordinary skill in the art will understand that many modifications can be made thereto within the scope of the claims that follow. Accordingly, it is not intended that the scope of the present systems and methods in any way be limited by the above description.

What is claimed is:

1. A method for providing to a client an element of a first workbook, wherein the first workbook is formatted for a first spreadsheet application, the steps comprising:
   providing, by a server, an application programming interface (API), wherein the API defines network-traversable paths to elements within workbooks accessible by the server, including the first workbook;
   receiving, at the server, a request from the client for discovery of one or more available elements of the first workbook and one or more settable parameters;
   providing to the client a list of the one or more available elements, including at least a first element, and a list of the one or more settable parameters for the first element, including at least a first parameter, wherein the first element comprises less than all of the first workbook, and wherein the first workbook comprises data;
   receiving, from the client, a first value for the first parameter, wherein the first value for the first parameter changes at least some of the data of the workbook;
   receiving a request, by the client, for the first element, the request for the first element including a network-traversable path for the first element according to the API, and a uniform resource locator specifying less than all of the first workbook;
   calculating the first element based on the first value; and
   providing the calculated first element to the client;
   wherein calculating the first element based on the first value comprises:
      creating a transient copy of the first workbook; and
      discarding the transient copy of the first workbook after providing the calculated first element to the client.

2. The method of claim 1, wherein the request for the first element includes a format, and the calculated first element is provided to the client in the format.

3. The method of claim 2, wherein the format comprises at least one of: an ATOM feed, HTML, and an image.

4. The method of claim 1, wherein the first element comprises at least one of: a range of data cells in the first workbook, a chart, a table, and a pivot table.

5. The method of claim 1, wherein the request for discovery and the request for the first element comprise uniform resource locators, and the client comprises a web browser.

6. The method of claim 1, wherein the request for the first element includes a path to the server and a path within the workbook to the first element.

7. The method of claim 1, wherein the first value is received as part of the request for the first element.

8. Computer storage memory device including computer-executable instructions that, when executed by a computer, perform a method for providing to a client an element of a first workbook, wherein the first workbook is formatted for a first spreadsheet application, the method steps comprising:
   providing, by a server, an application programming interface (API), wherein the API defines network-traversable paths to elements within workbooks accessible by the server, including the first workbook;
   receiving, at the server, a request from the client for discovery of one or more available elements of the first workbook and one or more settable parameters;
   providing to the client a list of the one or more available elements of the first workbook, including at least a first element, and a list of one or more settable parameters for the first element, including at least a first parameter, wherein the first element comprises less than all of the first workbook, and wherein the first workbook comprises data;
   receiving, from the client, a first value for the first parameter, wherein the first value for the first parameter changes at least some of the data of the workbook;
   receiving a request, by the client, for the first element, wherein the request by the client includes a network-traversable path for the first element according to the API, and wherein the request for the first element comprises a uniform resource locator specifying less than all of the first workbook;
   calculating the first element based on the first value; and
   providing the calculated first element to the client;
   wherein calculating the first element based on the first value comprises:
      creating a transient copy of the first workbook; and
      discarding the transient copy of the first workbook after providing the calculated first element to the client.

9. The computer storage media of claim 8, wherein the first value is received as part of the request for the first element.

10. The computer storage media of claim 8, wherein the request for the first element includes a format and the calculated first element is provided to the client in the format.

11. The computer storage media of claim 8, wherein the request for discovery and the request for the first element comprise uniform resource locators, and the client comprises a web browser.

12. The computer storage media of claim 8, wherein the request for the first element includes a path to the server and a path within the workbook to the first element.

13. The computer storage media of claim 8, wherein the first element comprises at least one of: a range of data cells in the first workbook, a chart, a table, and a pivot table.

14. A method for retrieving at a client an element of a first workbook stored at a server, wherein the first workbook is formatted for a first spreadsheet application, the steps comprising:
   sending, by the client, a request for discovery of one or more available elements of the first workbook and one or more settable parameters, wherein the server includes an application programming interface (API), and wherein the API defines network-traversable paths to elements within workbooks accessible by the server, including the first workbook;
   receiving, at the client, a list of the one or more available elements, including at least a first element, and a list of one or more settable parameters for the first element, including at least a first parameter, wherein the first element comprises less than all of the first workbook, and wherein the first workbook comprises data;
   providing, to the server, a first value for the first parameter, wherein the first value for the first parameter changes at least some of the data of the workbook;
   sending, by the client, a request for the first element, wherein the request for the first element includes a network-traversable path for the first element according to the API, and wherein the request for the first element comprises a uniform resource locator specifying less than all of the first workbook; and receiving, at the client, the first element, wherein the first element is calculated, and wherein calculating the first element comprises:

creating a transient copy of the first workbook; and
discarding the transient copy of the first workbook after the calculated first element is received at the client.

15. The method of claim 14, wherein the request for discovery and the request for the first element comprise uniform resource locators, and the client comprises a web browser.

16. The method of claim 14, wherein the request for the first element includes a format, and the calculated first element is received at the client in the format.

17. The method of claim 14, wherein the request for the first element includes a path to the server and a path within the workbook to the first element.

18. The method of claim 14, wherein the first value is provided as part of the request for the first element.

19. The method of claim 14, wherein the first element comprises at least one of: a range of data cells in the first workbook, a chart, a table, and a pivot table.

20. The method of claim 14, wherein the first element received at the client includes information dependent on the first value.

* * * * *